(12) United States Patent
Phillips

(10) Patent No.: US 9,585,518 B1
(45) Date of Patent: Mar. 7, 2017

(54) OUTDOOR COOKER WITH A HEAT MANAGEMENT PLATE

(71) Applicant: Yoder Smokers, Inc., Hutchinson, KS (US)

(72) Inventor: Joseph Michael Phillips, Hutchinson, KS (US)

(73) Assignee: YODER SMOKERS, INC., Hutchinson, KS (US)

( * ) Notice: Subject to any disclaimer, the term of this patent is extended or adjusted under 35 U.S.C. 154(b) by 254 days.

(21) Appl. No.: 14/316,267

(22) Filed: Jun. 26, 2014

Related U.S. Application Data

(60) Provisional application No. 61/840,052, filed on Jun. 27, 2013.

(51) Int. Cl.
A47J 37/07 (2006.01)

(52) U.S. Cl.
CPC .................................. *A47J 37/0718* (2013.01)

(58) Field of Classification Search
CPC ............................. A47J 37/0704; F24B 7/025
USPC ..... 99/339, 349, 400, 421 R, 446; 126/25 R, 126/41 R, 60, 61, 72, 77
See application file for complete search history.

(56) References Cited

U.S. PATENT DOCUMENTS

| | | | | |
|---|---|---|---|---|
| 2,902,026 | A * | 9/1959 | Hathorn, Jr. | A47J 37/0704 126/2 |
| 3,375,816 | A * | 4/1968 | Chesnut, Jr. | A47J 37/0704 126/25 R |
| 4,201,185 | A * | 5/1980 | Black | F24B 7/025 110/175 R |
| 4,696,282 | A * | 9/1987 | Incitti | F24B 1/202 126/25 R |
| 2003/0019492 | A1 * | 1/2003 | Williams | A47J 37/0704 126/41 R |

* cited by examiner

*Primary Examiner* — Thien S Tran

(57) ABSTRACT

A cooker includes a cooking chamber having a first end and a second opposite end. A firepot is located at the bottom of the cooking chamber near the first end. The firepot receives and burns fuel to heat the cooking chamber. An exhaust stack is mounted near the second end of the cooking chamber. A heat management plate divides the cooking chamber into a lower fire pit portion and an upper cooking portion. The heat plate has an array of hot gas convection openings that extend between a first location which is spaced away from the firewall and a second location that is adjacent to the stack wall. The open area presented by the openings increases between the first location and the second location. An optional adjustable gate may also be present in the heat management plate between the firewall and the first location.

9 Claims, 4 Drawing Sheets

OUTDOOR COOKER WITH A HEAT MANAGEMENT PLATE

RELATED APPLICATION

This application claims the benefit of U.S. Provisional Utility Patent Application No. 61/840,052 filed on Jun. 27, 2013 which is incorporated herein by reference.

FIELD

This invention relates to an wood pellet fired outdoor cooker.

BACKGROUND

It is advantageous to maintain generally uniform temperatures across a cooking chamber in a wood pellet fired outdoor cooker. Wood pellet fired outdoor cookers typically include a cooking chamber which extends between a fire wall and an opposite stack wall. Uniform temperatures may be difficult to maintain within a cooking chamber because, typically, the firepot, where wood pellets are received and burned to generate heat for the cooker, is located adjacent to the fire wall. Because of the firepot location, temperatures in the cooking chamber tend to be higher near the firepot and lower near the stack wall. Accordingly, what is needed is an improved outdoor cooker which tends to equalize the cooking chamber temperature between the fire wall and the stack wall.

SUMMARY

The above stated need is met by an improved wood pellet fired outdoor cooker. The outdoor cooker includes a cooking chamber that extends between a first end and an opposite second end. A fire pot for receiving and burning wood pellets is disposed at the bottom of the cooking chamber adjacent to the first end. An exhaust stack for venting hot gasses from the cooking chamber is disposed at the opposite second end of the cooking chamber. A heat plate divides the cooking chamber into an upper cooking portion and a lower fire pit portion. The heat plate presents an array of hot gas convection openings. The array of openings begins in an area that is spaced away from the first end of the cooking chamber and extends to the opposite second end of the cooking chamber. The open areas presented by the openings vary such that a larger proportion of the heat plate's area is open near the second end that is the case toward the first end. Preferably, a cooking grate is mounted directly above the heat plate. The heat plate may also include an optional, adjustable gate that is disposed between the first end of the cooking chamber and the array of openings. The adjustable gate is able to be adjusted between a closed position and an open position for allowing additional hot gasses to enter the upper cooking portion of the cooking chamber from the lower fire pit portion in order to increase the cooking temperature in the cooking chamber near the first end of the cooking chamber.

DETAILED DESCRIPTION

Figure 2:
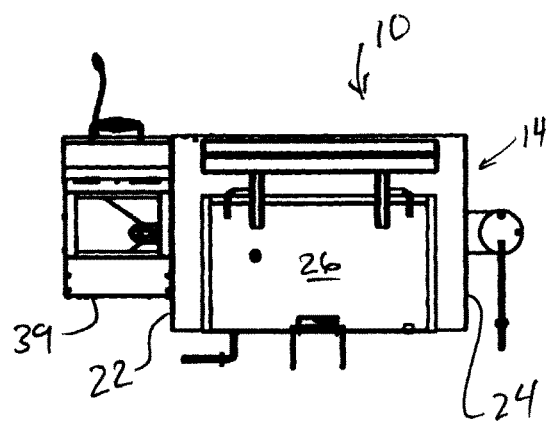
FIG. 2 is a top view of the cooker.
Figures 1, 3:
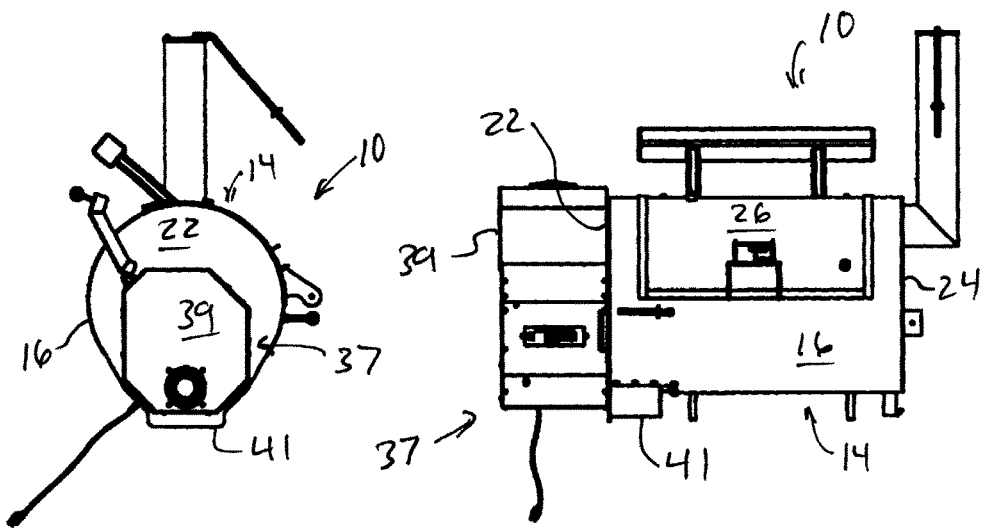
FIG. 1 is a front view of the cooker.
FIG. 3 is a side view of the cooker.

Referring to the drawings, FIGS. 1-5 shows an example embodiment of an improved cooker 10. In this example, cooker 10 includes a cooking chamber 14 which is typically mounted on a frame or other suitable support which is not shown. Generally, cooking chamber 14, in this example, has an elongated cylindrical sidewall 16 which extends between a generally flat, upright firewall 22 and a stack wall 24. Stack wall 24 supports an exhaust stack 25 that communicates with cooking chamber 14 for venting hot gasses from cooking chamber 14. Stack 25 also has an adjustable stack lid 25A at its upper end that can be adjusted to control the flow of hot gasses from cooking chamber 14. A lid 26 is pivotally mounted in cylindrical sidewall 16 of cooking chamber 14 and is arranged to pivot between a closed position and an open position.

In this example, a heat source 37 is mounted to firewall 22. Heat source 37, in this example, includes a wood pellet box 39 that is mounted to firewall 22 and a fire pot 41. In this example, firepot 41 is mounted to the underside of sidewall 16 so that it is positioned generally under and outside cooking chamber 14. In this example, firepot 41 is located next to firewall 22 but firepot 41 could be placed in another suitable location. Wood pellet box 39 includes a mechanical device (not shown) that operates to transfer wood pellets from wood pellet box 39 to fire pot 41. The combustion of wood pellets in fire pot 41 supplies heat to cooking chamber 14. Cooking chamber 14 is divided horizontally by a generally horizontal heat management plate 64 into a upper cooking portion 82 and a lower fire pit portion 84. Preferably, a removable cooking grate 93 for supporting food items for cooking is positioned immediately above heat management plate 64. All of the components mentioned here are preferably fashioned from plate steel or sheet steel, or perhaps sheet or plate aluminum which is sufficiently strong, tough and capable of withstanding elevated temperatures typical for grilling or broiling food.

Figure 4:
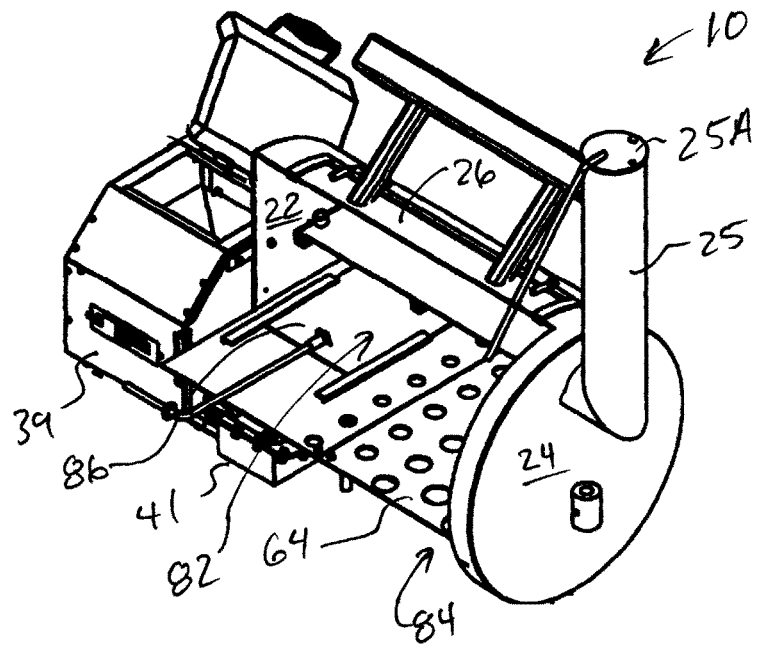
FIG. 4 is a perspective view of the cooker with the sidewall of the cooking chamber removed to show the internal structure of the cooker.
Figure 5:
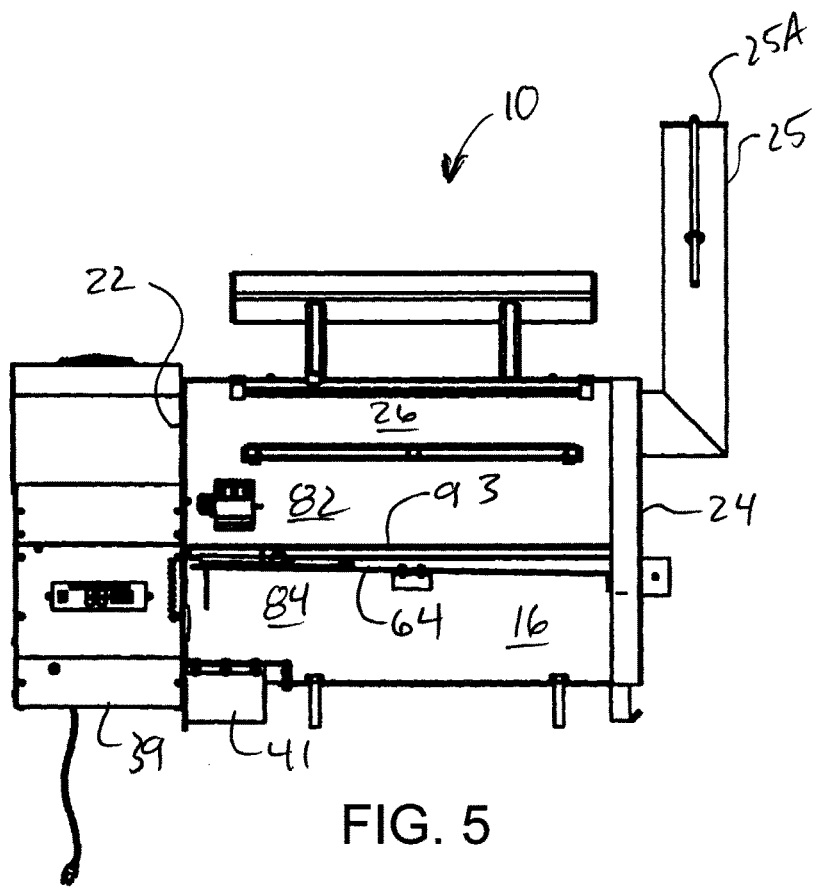
FIG. 5 is a front view of the cooker with the sidewall of the cooking chamber removed to show the internal structure of the cooker
Figure 6:
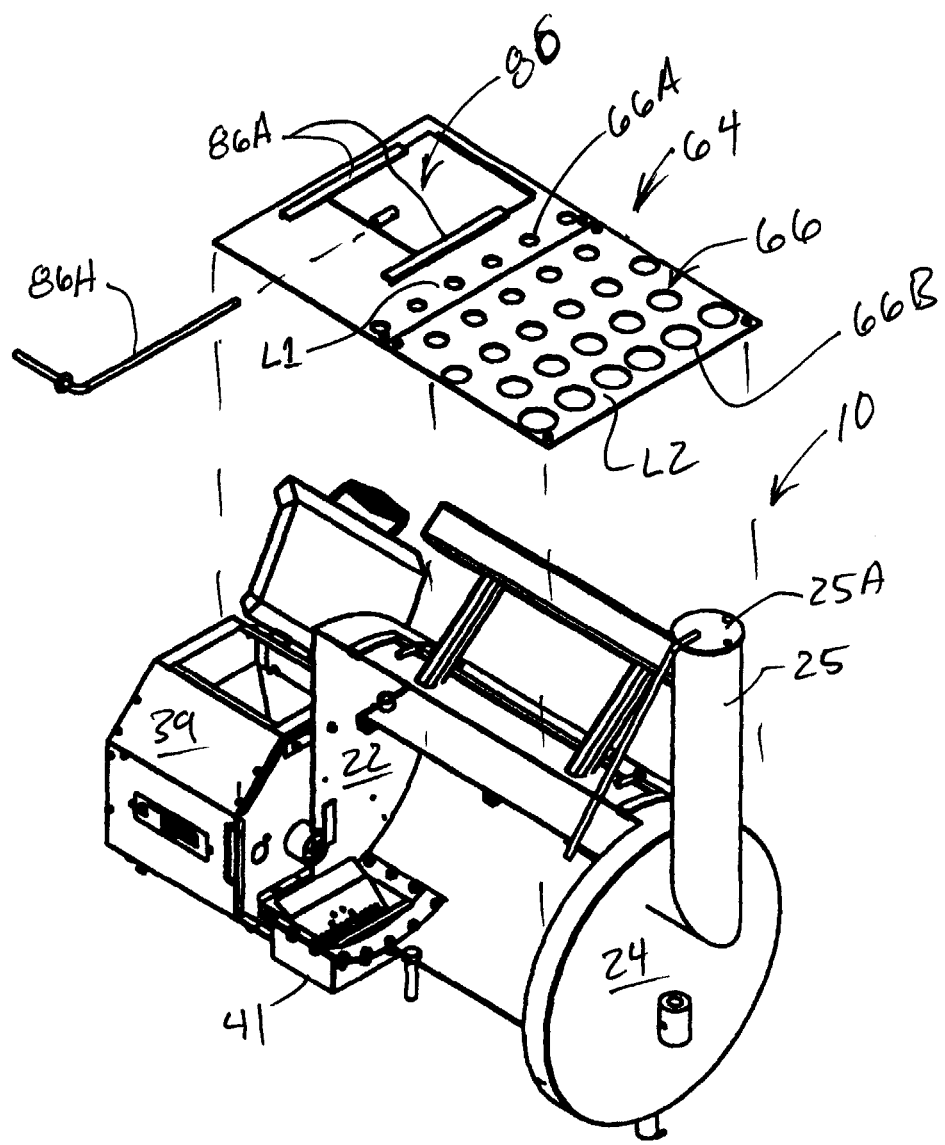
FIG. 6 is a perspective view of the cooker with the sidewall of the cooking chamber removed to show the internal structure of the cooker with the heat management plate removed.

As noted above, cooking chamber 14 is generally divided between an upper cooking portion 82 and a lower firepit portion 84 by a heat management plate 64. As can be best seen in FIG. 4 and FIGS. 6-9, heat management plate 64 extends across cooking chamber 14 and extends between firewall 22 and stack wall 24 and is generally horizontal. As shown in FIG. 6, heat management plate 64 includes an array of openings 66 and an adjustable gate 80. The array of openings 66 are distributed between a first longitudinal location L1 indicated in FIG. 6 which is spaced away from firewall 22 and a second longitudinal location L2 which is indicated in FIG. 6 as being adjacent to stackwall 24 when heat management plate 64 is installed as shown in FIG. 4. In this example, openings 66 are graduated from a relatively small sized openings 66A to a relatively large sized opening 66B. As can be seen in FIG. 6, in this example, individual openings increase in size from the small size type opening 66A near first location L1 (closer to firewall 22) to a substantially larger size type opening 66B near second location L2 (adjacent to stack wall 24). The skilled reader will readily appreciate that the object of having openings 66 which vary in size is to vary the amount of removed area in heat plate 64 between locations L1 and L2. So, for example, this object can also be accomplished by establishing a pattern of openings of equal size wherein the number of openings in a given area is greater near location L2 and less near location L1.

The graduated open area presented by openings 66 noted above function to at least partially equalize the temperatures in the cooking portion of the cooking chamber. This occurs because more hot gas rises into the cooking portion in those areas where openings 66 are present in heat management plate 64 and this effect occurs to an even greater extent where a larger flow area is available because larger openings 66 are present in heat management plate 64. Since firepot 41 is located next to firewall 22, the temperature in cooking portion 82 of cooking chamber 14 near firewall 22 would tend to be higher than the temperature near stackwall 24. This temperature differential is reduced or even reversed because increased amounts hot gasses convect into areas of cooking portion 82 to a greater degree depending on how remote an area is from firewall 22. More hot gas enters cooking portion 82 where openings 66 are present and even more hot gas does so where larger openings 66 are present. Thus, the array of graduated openings 66 tends to level the temperature gradient that would otherwise occur between firewall 22 and stack wall 24.

Figure 7:
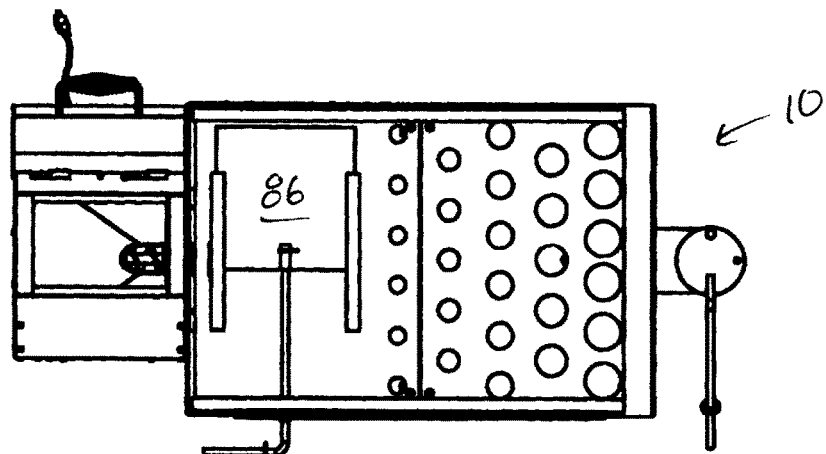
FIG. 7 is a top view of the cooking chamber with the sidewall of the cooking chamber removed to show the heat management plate with the heat management plate closed.
Figure 8:
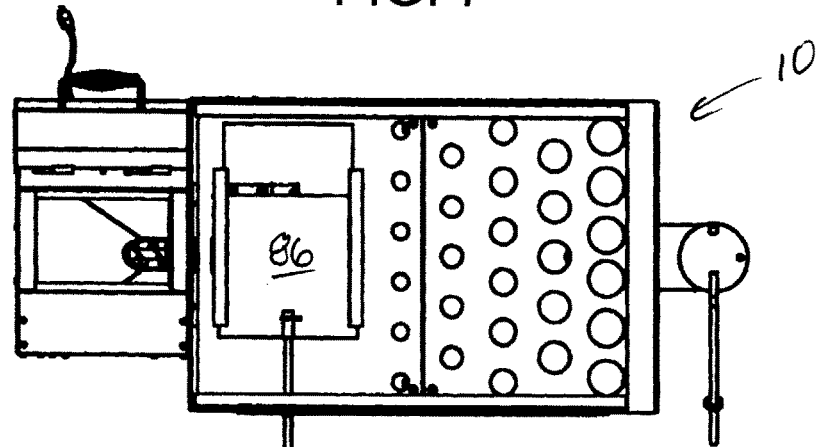
FIG. 8 is a top view of the cooking chamber with the sidewall of the cooking chamber removed to show the heat management plate with the heat management plate partially open.
Figure 9:
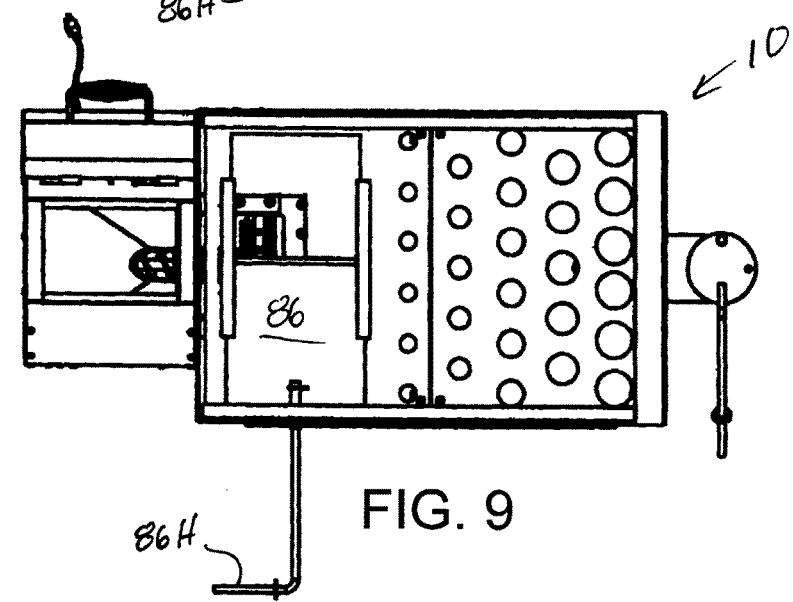
FIG. 9 is a top view of the cooking chamber with with the sidewall of the cooking chamber removed to show the heat management plate with the heat management plate fully open.

In this example, heat management plate 64 also includes an adjustable gate 80. Adjustable gate 80 is situated in heat management plate 64 between the firewall end of heat management plate 64 and the array of openings 66 described above. As can be seen in FIG. 6, adjustable gate 80, in this example, is a sliding gate that is received by two side channels 86A and includes a handle 86H which extends outside cooking chamber 16 for easy manipulation by an operator and is operable to adjustably slide between a closed position and an open position. The skilled reader will appreciate that the sliding gate illustrated in FIG. 6 may be replaced by any one of a number of adjustable structures which may be adjusted between position in which the structure is closed and an position in which the structure presents an opening or a plurality of openings. Adjustable gate 80 allows an operator to cause a controlled flow of hot gas into cooking chamber 82 near firewall 22. Opening adjustable gate 80 has the effect of increasing the cooking temperature in cooking chamber 82 near firewall 22. FIG. 7 shows adjustable gate 80 in the closed position. FIG. 8 shows adjustable gate 80 in the partially open position and FIG. 9 shows adjustable gate 80 in the open position.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A cooker, comprising:
   a cooking chamber having a first end and an opposite second end,
   a firepot mounted beneath the cooking chamber adjacent to the first end of the cooking chamber, the firepot operable for receiving and burning fuel to supply hot combustion gases for heating the cooking chamber,
   an exhaust stack mounted to the opposite second end of the cooking chamber operable for conveying hot gasses from the cooking chamber,
   a heat management plate which divides the cooking chamber into an upper cooking portion and a lower fire pit portion, the heat management plate having an array of hot gas convection openings which begin at a first location and extends to a second location, the second location being more distant from the first end of the cooking chamber than the first location, the hot gas convection openings providing open areas for the passage of hot gas from the lower fire pit portion of the cooking chamber to the upper cooking portion of the cooking chamber, the open areas provided by the hot gas convection openings increasing in area between the first location and the second location.

2. The cooker of claim 1, further comprising:
   an adjustable gate disposed in the heat management plate between the first end of the cooking chamber and the hot gas convection openings, the adjustable gate operable for adjustment between a closed position and an open position such that a greater amount of hot gas flows from the lower fire pit portion of the cooking chamber to the upper cooking portion of the cooking chamber when the adjustable gate is open thereby increasing the temperature in the upper cooking portion of the cooking chamber above the adjustable gate.

3. The cooker of claim 1, further comprising:
   a manually adjustable outlet on the exhaust stack which is adjustable between a closed position and an open position.

4. The cooker of claim 2, further comprising:
   a manually adjustable outlet on the exhaust stack which is adjustable between a closed position and an open position.

5. A cooker, comprising:
   a cooking chamber which is defined by a firewall, an opposite stack wall and an enclosing sidewall extending between the firewall and the stack wall,
   a firepot mounted to the sidewall beneath the cooking chamber adjacent to the firewall, the firepot operable for receiving wood pellets, igniting them and burning them to generate hot combustion gases for heating the cooking chamber,
   an exhaust stack mounted to the stackwall, the exhaust stack communicating with the cooking chamber and operable for conveying hot gasses from the cooking chamber,
   a heat management plate which divides the cooking chamber into an upper cooking portion and a lower fire pit portion, the heat management plate having an array of hot gas convection openings which begin at a first location that is spaced away from the firewall and extends to a second location adjacent to the stack wall, the hot gas convection openings providing open areas for the passage of hot gas from the lower fire pit portion of the cooking chamber to the upper cooking portion of the cooking chamber, the open areas provided by the hot gas convection openings increasing in area between the first location and the second location.

6. The cooker of claim 5, further comprising:

an adjustable gate disposed in the heat management plate between the first end of the cooking chamber and the hot gas convection openings, the adjustable gate operable for adjustment between a closed position and an open position such that a greater amount of hot gas flows from the lower fire pit portion of the cooking chamber to the upper cooking portion of the cooking chamber when the adjustable gate is open thereby increasing the temperature in the upper cooking portion of the cooking chamber above the adjustable gate.

7. The cooker of claim 6, wherein:

the adjustable gate is a sliding gate which is slidably received by the heat management plate and includes a handle which extends outside the cooking chamber.

8. The cooker of claim 5, further comprising:

a manually adjustable outlet on the exhaust stack which is adjustable between a closed position and an open position.

9. The cooker of claim 6, further comprising:

a manually adjustable outlet on the exhaust stack which is adjustable between a closed position and an open position.

* * * * *